US009332201B2

United States Patent
Lewkow et al.

(10) Patent No.: US 9,332,201 B2
(45) Date of Patent: May 3, 2016

(54) CURVED IMAGE SENSOR FOR A CURVED FOCAL SURFACE

(71) Applicant: Google Inc., Mountain View, CA (US)

(72) Inventors: Roman Lewkow, San Jose, CA (US); Philip Sean Stetson, Wexford, PA (US)

(73) Assignee: Google Inc., Mountain View, CA (US)

(*) Notice: Subject to any disclaimer, the term of this patent is extended or adjusted under 35 U.S.C. 154(b) by 31 days.

(21) Appl. No.: 14/283,067

(22) Filed: May 20, 2014

(65) Prior Publication Data

US 2015/0341578 A1   Nov. 26, 2015

(51) Int. Cl.
  *H04N 5/374* (2011.01)
  *H04N 5/225* (2006.01)

(52) U.S. Cl.
  CPC ............. *H04N 5/374* (2013.01); *H04N 5/225* (2013.01); *H04N 5/2253* (2013.01)

(58) Field of Classification Search
  CPC ............................... H04N 5/335–5/378; H01L 27/14643–27/14663
  USPC ........... 348/207.99, 231.9, 231.99, 294, 335, 348/340, 61; 438/55, 69; 250/208.1; 257/225–234, 257, 258, 291–294, 257/431–448
  See application file for complete search history.

(56) References Cited

U.S. PATENT DOCUMENTS

| | | | | |
|---|---|---|---|---|
| 3,351,763 A * | 11/1967 | Shuart | ........................... | 348/332 |
| 6,618,093 B1 * | 9/2003 | Levy | ............................. | 348/374 |
| 6,657,378 B2 * | 12/2003 | Forrest et al. | ................. | 313/503 |
| 9,041,851 B2 * | 5/2015 | Forrest | .......................... | 348/345 |
| 2009/0115875 A1 * | 5/2009 | Choi et al. | .................... | 348/294 |
| 2011/0032386 A1 * | 2/2011 | Tsai et al. | ................ | 348/231.99 |
| 2012/0154624 A1 * | 6/2012 | Kobayashi | ................ | 348/222.1 |
| 2014/0098267 A1 * | 4/2014 | Tian et al. | ..................... | 348/272 |

OTHER PUBLICATIONS

Ford, et al.,' "Fiber-coupled Monocentric Lens Imaging", Imaging and Applied Optics OSA 2013, 2013, 3 pages.

* cited by examiner

*Primary Examiner* — Lin Ye
*Assistant Examiner* — Chriss Yoder, III
(74) *Attorney, Agent, or Firm* — Wolfe-SBMC

(57) ABSTRACT

This document describes curved image sensors capable of sensing light from a monocentric lens. This curved image sensor receives light focused at a curved focal surface and then provides electric signals from this curved image sensor to a planar computing chip, such as a CMOS chip. By so doing, the higher image quality, smaller size, and often smaller weight of monocentric lenses can be gained while using generally high-quality, low-cost planar chips.

20 Claims, 8 Drawing Sheets

CURVED IMAGE SENSOR FOR A CURVED FOCAL SURFACE

BACKGROUND

This background description is provided for the purpose of generally presenting the context of the disclosure. Unless otherwise indicated herein, material described in this section is neither expressly nor impliedly admitted to be prior art to the present disclosure or the appended claims.

Conventional imaging devices use multi-lens assemblies that provide a flat focal plane. These multi-lens assemblies enable use of planar image devices, such as a silicon chip having an integrated array of light-sensitive photodetectors. These conventional imaging devices, however, have various limitations, such as poor resolution at edges of the flat focal plane and a need for highly precise lens alignment in the assembly. The dimensions of the multi-lens assemblies also result in a compromise between image quality and thickness of computing devices that have the imaging device, such as mobile phones, smaller cameras, and computing spectacles. In effect, multi-lens assemblies limit how thin or small a device can be when high-quality imaging is desired.

In contrast, monocentric lenses are capable of providing higher optical resolution across a wide field of view, often at smaller sizes and costs that multi-lens assemblies. Monocentric lenses, however, produce a curved focal surface rather than the flat focal plane common to multi-lens assemblies. Because of this, high-quality and low-cost planar computing and sensing chips cannot readily be used with monocentric lenses.

BRIEF DESCRIPTION OF THE DRAWINGS

Apparatuses of and techniques using a curved image sensor for a curved focal surface are described with reference to the following drawings. The same numbers are used throughout the drawings to reference like features and components.

DETAILED DESCRIPTION

This document describes curved image sensors capable of sensing light from a monocentric lens. This curved image sensor receives light focused on a curved focal surface and then provides electric signals from this curved image sensor to a planar integrated circuit substrate, such as a Complementary Metal-Oxide Semiconductor (CMOS) chip. By so doing, the wider field of view, smaller size, and often smaller weight of monocentric lenses can be gained while using generally high-quality, low-cost planar chips.

The following discussion describes an operating environment, example curved image sensors for curved focal surfaces, followed by techniques that may be employed in this environment, and ending with an example electronic device.

Example Environment

Figure 1:
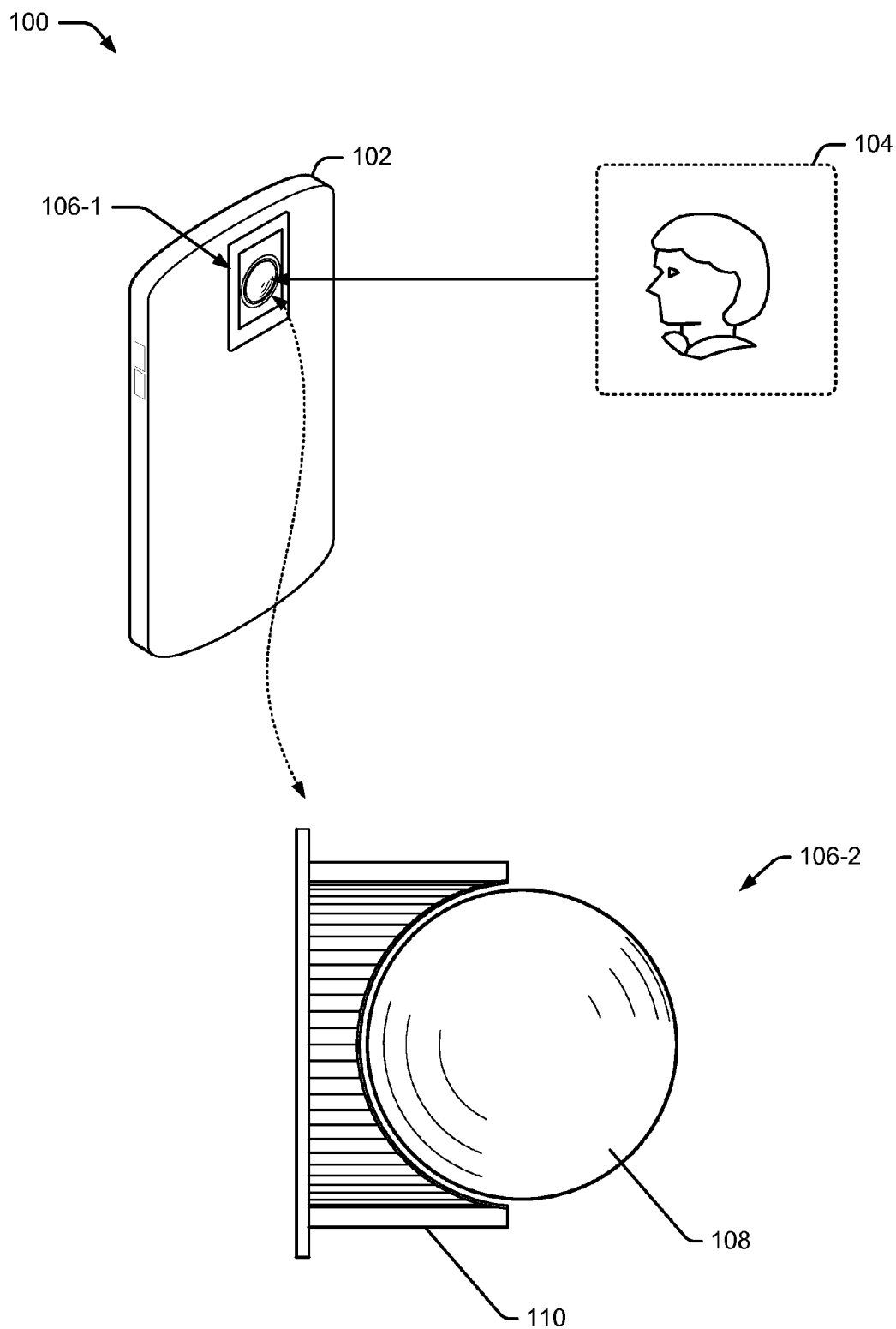
FIG. 1 illustrates an example environment in which a curved image sensor for a curved focal surface can be enabled.

FIG. 1 illustrates an example environment 100 in which a curved image sensor for a curved focal surface can be embodied. Example environment 100 includes a computing device 102 capturing images of a scene 104. Computing device 102 includes an imaging device 106 shown in part at 106-1 and in detail at 106-2. Imaging device 106 includes monocentric lens 108 and curved image sensor 110. Ways in which monocentric lens 108 operates are described in FIG. 2, followed by a detailed illustration of curved image sensor 110 in FIG. 3.

Figure 2:
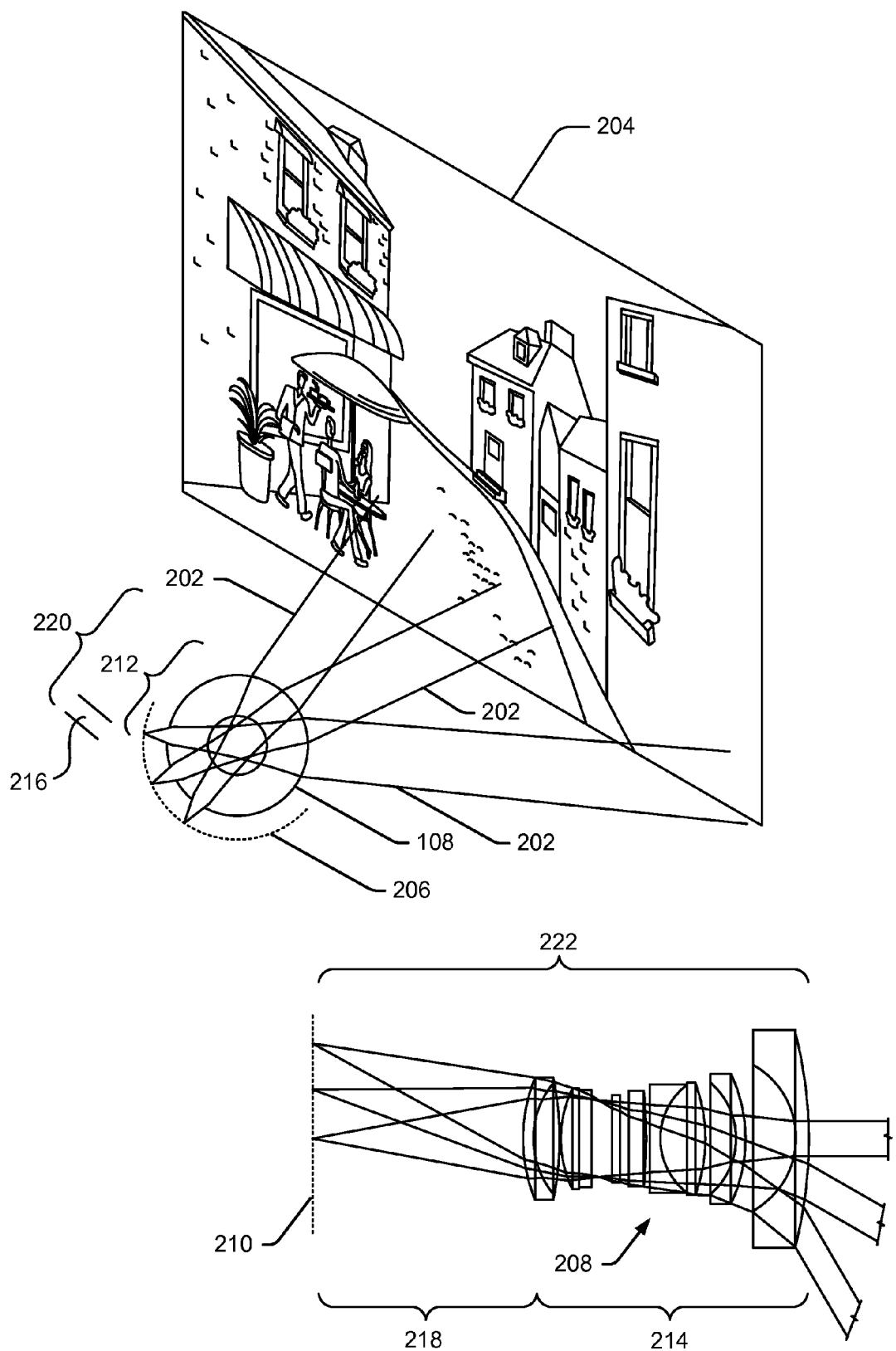
FIG. 2 illustrates optical properties of a monocentric lens, showing light from a scene captured by the monocentric lens and, for contrast, a traditional multi-lens assembly having multiple aspherical lenses.

FIG. 2 illustrates optical properties of monocentric lens 108, which shows light 202 from a scene 204 captured by monocentric lens 108. Monocentric lens 108 focuses this light 202, and thus scene 204, to a curved focal surface 206. Contrast this with multi-lens assembly 208 focusing to a flat focal plane 210. Multi-lens assembly 208 is shown with multiple aspherical lenses, but may include a mix of lenses and other optical elements. While not to scale, multi-lens assembly 208 often requires a substantially larger Z-height (in this example the assembly length along the optical axis) than a monocentric lens. Z-heights not only include focal-path dimensions of the lens or lens assembly, shown at monocentric-lens focal path 212 and multi-lens-assembly focal path 214, but also back-focal distance, shown here as monocentric-lens back-focal distance 216 and multi-lens-assembly back-focal distance 218. Thus, monocentric-lens Z-height 220, assuming similar image quality, is substantially smaller than multi-lens-assembly Z-height 222. Note also the complexity in making, configuring, and aligning the seven lens elements of multi-lens assembly 208 and that monocentric lens 108 may also have a field of view (e.g., 120 to 180 degrees) that is superior to that of multi-lens assembly 208.

While the example shown of monocentric lens 108 is that of a singular, spherical lens, multiple lenses or a non-spherical lens is permitted. Monocentric lenses may have a lens surface that has a common center but need not be fully spherical. A common center may include a section of a sphere, for example. Further, multiple monocentric lenses can be used, which, while it may increase Z-height, the precision needed to align monocentric lenses can be lower than aspherical lenses and fewer lenses may be used than in a multi-lens assembly.

Figure 3:
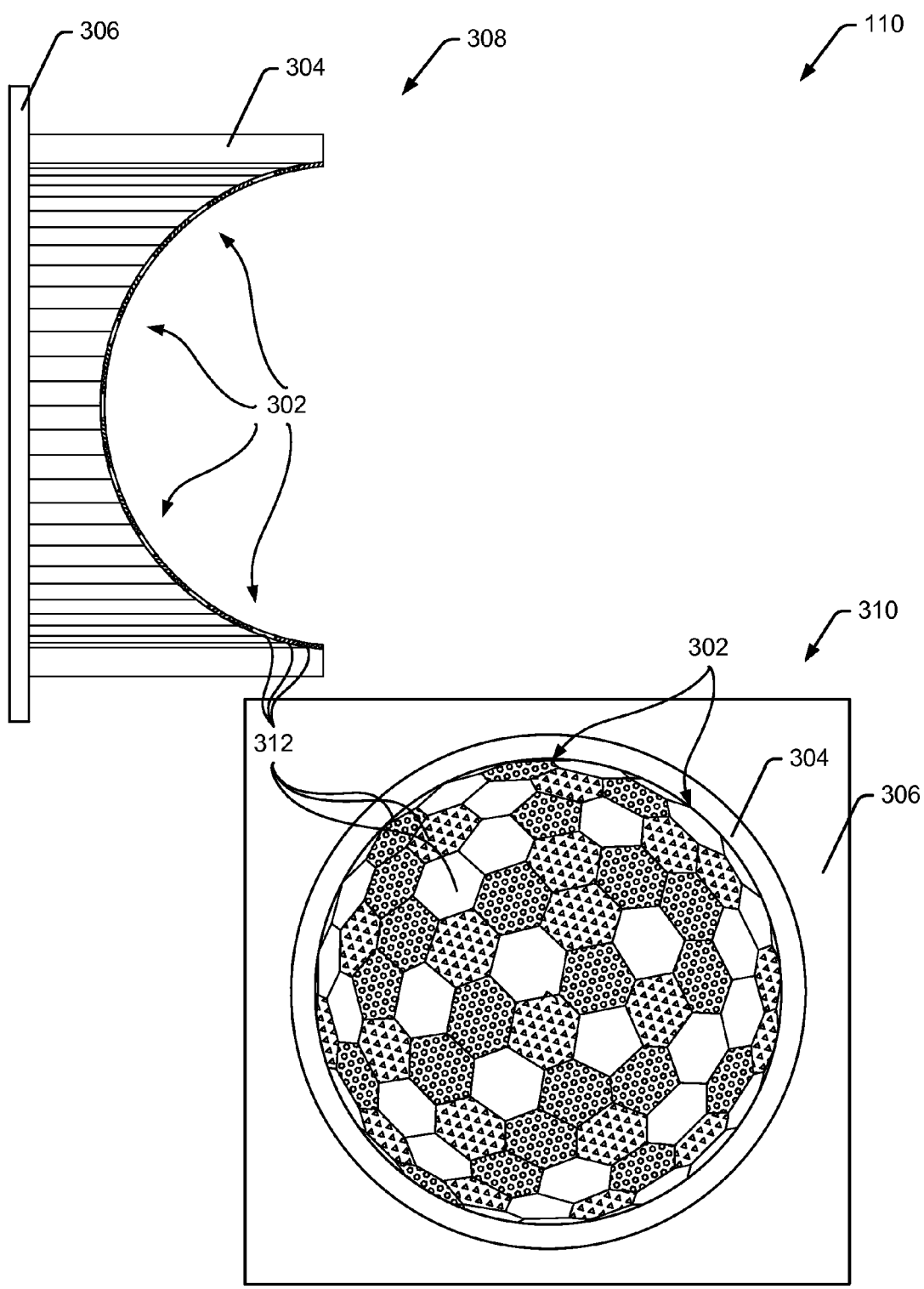
FIG. 3 illustrates the curved image sensor of FIG. 1 in greater detail, including a curved surface, a curved-to-planar substrate, and a circuit.

FIG. 3 illustrates curved image sensor 110 of FIG. 1 in greater detail. Curved image sensor 110 includes a curved surface 302, a curved-to-planar substrate 304, and a circuit 306. Curved image sensor 110 is shown in cross-section view 308 and in plan view 310. Plan view 310 is from a perspective at which an image is captured but without a lens being shown (looking down on curved surface 302). Curved surface 302 can be surfaced to conform to some section of a sphere, which in turn corresponds to a surface of monocentric lens 108, and, as shown in FIG. 1, surrounds a portion of monocentric lens 108.

Curved surface 302 includes photodetectors 312, which are disposed on or in curved surface 302, and are capable of sensing light at curved surface 302. In response to light, photodetectors 312 provide electric signals at curved surface 302. This illustration shows resolutions of photodetectors 312 with hexagons of a particular size, which are here assumed to be pixels. The number of photodetectors 312 is simplified for visual clarity, as showing millions of pixels is not possible for this type of illustration. The varying shades illustrated for photodetectors 312 indicate sensitivity to different wavelengths of lights, such as red, green, or blue.

Photodetectors 312 may include an array of deposited photodetectors, which can be non-silicon and be active-pixel photodetectors. Other types of photodetectors can be used, such as an organic light-sensing material having amorphous sensing areas capable of spatially-coherently detecting light and converting the light into the electric signals. This material may be one or multiple layers, such as with three layers each of which is sensitive to a light of a different wavelength. Note that some organic light-sensing materials generate a charge (e.g., an electric signal) sufficient for an electrical conductor to carry the charge (e.g., sense) without neighboring conductors doing the same, as some organic materials have a high conductivity in a perpendicular direction (e.g., perpendicular to curved surface 302) and a low conductivity in a parallel direction (e.g., parallel to curved surface 302). Amorphous areas are approximated by hexagons shown at photodetectors 312, though this is for illustration purposes only.

Still other types of photodetectors 312 can be on or in curved surface 302, including quantum-dot photodetectors. Quantum-dot photodetectors produce an electronic signal when excited by visible (and in some cases non-visible) light. They are generally a nanocrystal made of a semiconductor material and which is small enough to exhibit quantum characteristics. One potential advantage to quantum-dot photodetectors is that they can be applied to curved surfaces and, in some cases, be applied over electrical conductors, such as to electrical connections ends illustrated below. Quantum-dot photodetectors can be disposed on curved surface 302 as groups of dots or layers of dots, each of the groups or layers acting as one or more of photodetectors 312. Photodetectors 312 may also include photodetective materials sensitive to the infrared spectrum, such as indium gallium arsenide (InGaAs), indium arsenide or monoarsenide (InAs, a semiconductor), or indium antimonide (InSb). Some quantum dots can be formed from a monolayer of indium arsenide on indium phosphide or gallium arsenide, or from a layer of indium gallium arsenide. Also, indium antimonide can be grown from organometallic compounds using chemical vapor deposition (e.g., matalorganic vapor-phase epitaxy, deposited on curved surface 302). Infrared-spectrum sensitivity can be used for thermal imaging and improved low-light imaging, alone or in combination with photodetectors sensitive to visible light.

Curved-to-planar substrate 304 is capable of receiving electric signals at curved surface 302 and providing the electric signals to a planar surface, such as circuit 306. In some cases curved-to-planar substrate 304 is a dense arrangement of electric connectors within an insulating medium. These electric connectors can connect, such as through wires (e.g., metal or nanotube), electric signals from photodetectors on curved surface 302 to circuit 306. As noted above, a high-quality and relatively inexpensive CMOS chip (e.g., one configured to read electric signals from a photodetector array) can be used. This CMOS chip can be similar to some current CMOS sensors, though with the actual photodetectors not placed on the chip. Instead, electrical receptors are on a planar surface or substrate of the chip, which can be connected via curved-to-planar substrate 304 to photodetectors of curved surface 302. Curved image sensor 110 can be an integrated device having photodetectors 312 on curved surface 302, curved-to-planar substrate 304, and circuit 306.

Figure 4:
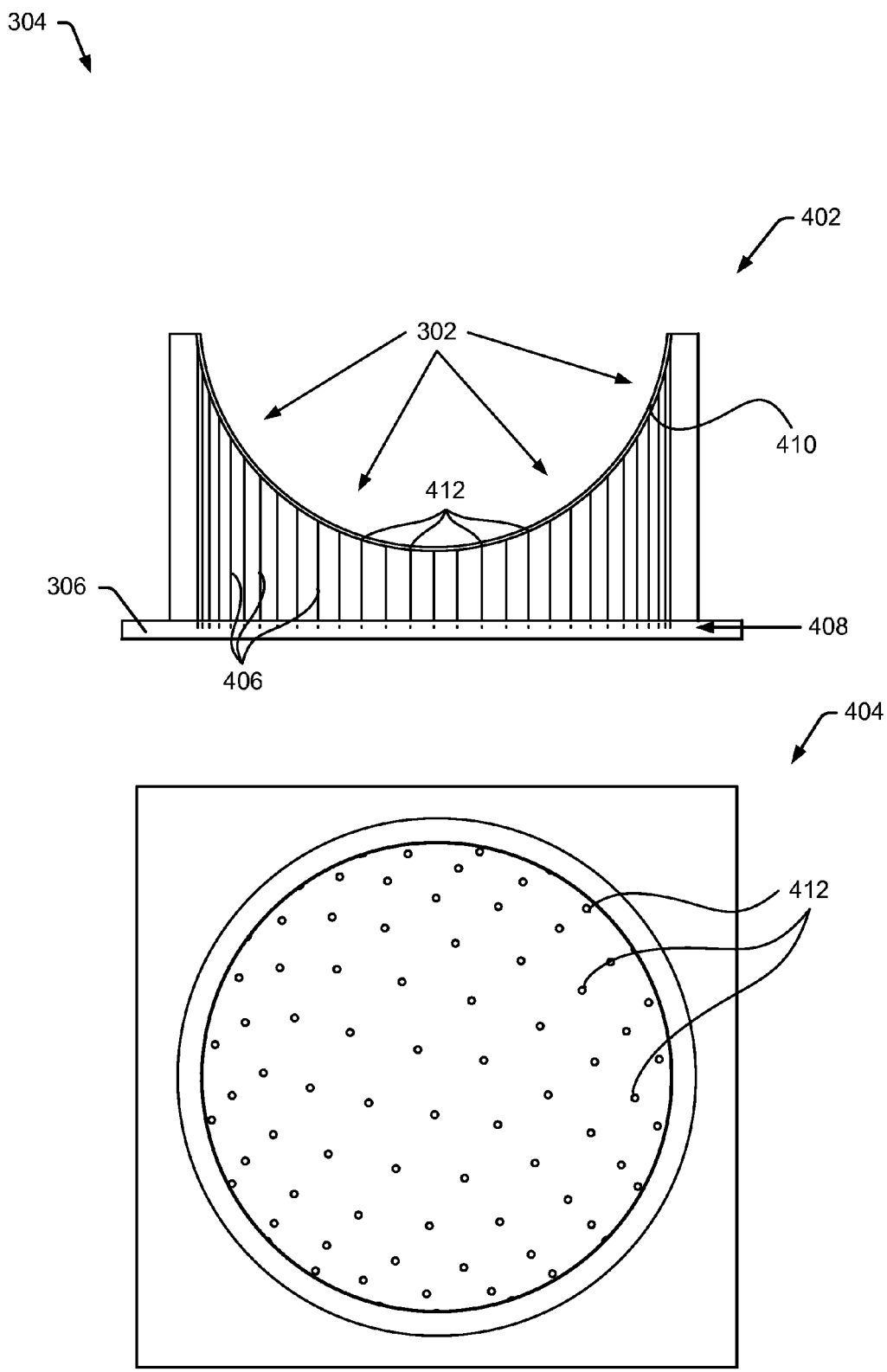
FIG. 4 illustrates a curved-to-planar substrate in cross-section and plan views, including electric connections to photodetectors on a curved surface.

In more detail, consider curved-to-planar substrate 304 as illustrated in FIG. 4 in cross-section view 402 and plan view 404. Curved-to-planar substrate 304 includes electric connections 406 to each sensor 312 (or sensor area or region) on curved surface 302. Each of electric connections 406 connect photodetectors electrically to circuit 306 via electric receptors 408. Note that in this example an organic layer 410 of sensing material is shown, rather than hexagonal photodetectors, with curved-surface electric connection ends 412 shown in plan view 404 (which may or may not be visible through organic layer 410).

As noted in part above, circuit 306 is capable of receiving electric signals at a planar surface and from the curved-to-planar substrate. Examples of this reception are through electric receptors 408 within circuit 306, received through electric connections 406, which in turn receive the electric signals from photodetectors 312 at curved surface 302 and through curved-surface electric connection ends 412.

In some cases, circuit 306 includes a regular array of electric receptors, such as in cases where circuit 306 is a CMOS chip designed for an array of photodetectors but does not include those photodetectors. In such a case, electric receptors 408 may be in a regular array that is not spatially consistent with electric connections 406 at curved surface 302. Thus, curved-to-planar substrate 304 may include electric connections that are non-vertical or are arranged to connect an irregular array of photodetectors (and thus curved-surface electric connections ends 412) to a regular or otherwise differing array of connections. This can enable use of less expensive, less customized, and/or denser circuits. Note that the plane described for circuit 306 may include a rough approximation of a plane or multiple planes, such as a roughly planar surface having steps on circuit 306.

Figure 5:
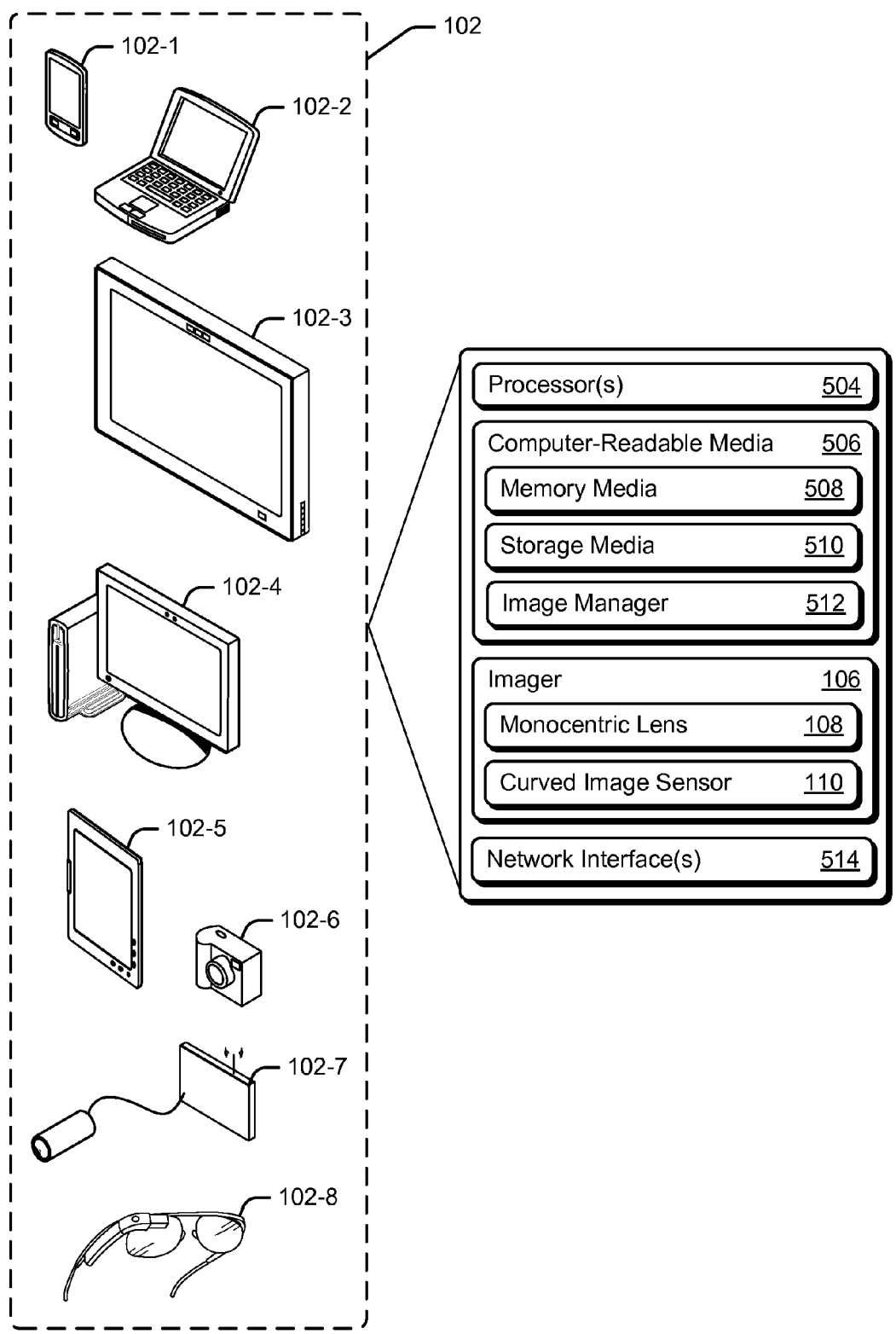
FIG. 5 illustrates the computing device of FIG. 1 in greater detail.

Having generally described curved image sensors for curved focal surfaces and imagers, this discussion now turns to FIG. 5, which illustrates computing device 102 of FIG. 1 in greater detail. Computing device 102 is illustrated with various non-limiting example devices: smartphone 102-1, laptop 102-2, television 102-3, desktop 102-4, tablet 102-5, camera 102-6, security system 102-7, and computing spectacles 102-8. Computing device 102 includes processor(s) 504 and computer-readable media 506, which includes memory media 508 and storage media 510. Applications and/or an operating system (not shown) embodied as computer-readable instructions on computer-readable memory 506 can be executed by processor(s) 504 to provide some of the functionalities described herein. Computer-readable media 506 also includes image manager 512 (described below). As noted in FIG. 1, computing device 102 includes imager 106, which in turn includes monocentric lens 108 and curved image sensor 110.

Computing device 102 may also include network interface(s) 514 for communicating data over wired, wireless, or optical networks. By way of example and not limitation, network interface 514 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Example Method

The following discussion describes a method by which techniques are implemented to enable use of a curved image sensor for a curved focal surface. This method can be implemented utilizing the previously described environment and example photodetectors, substrates, and circuits, such as those shown in FIGS. 1-5. Aspects of this method is illustrated in FIG. 6, which is shown as operations performed by one or more entities.

Figure 6:
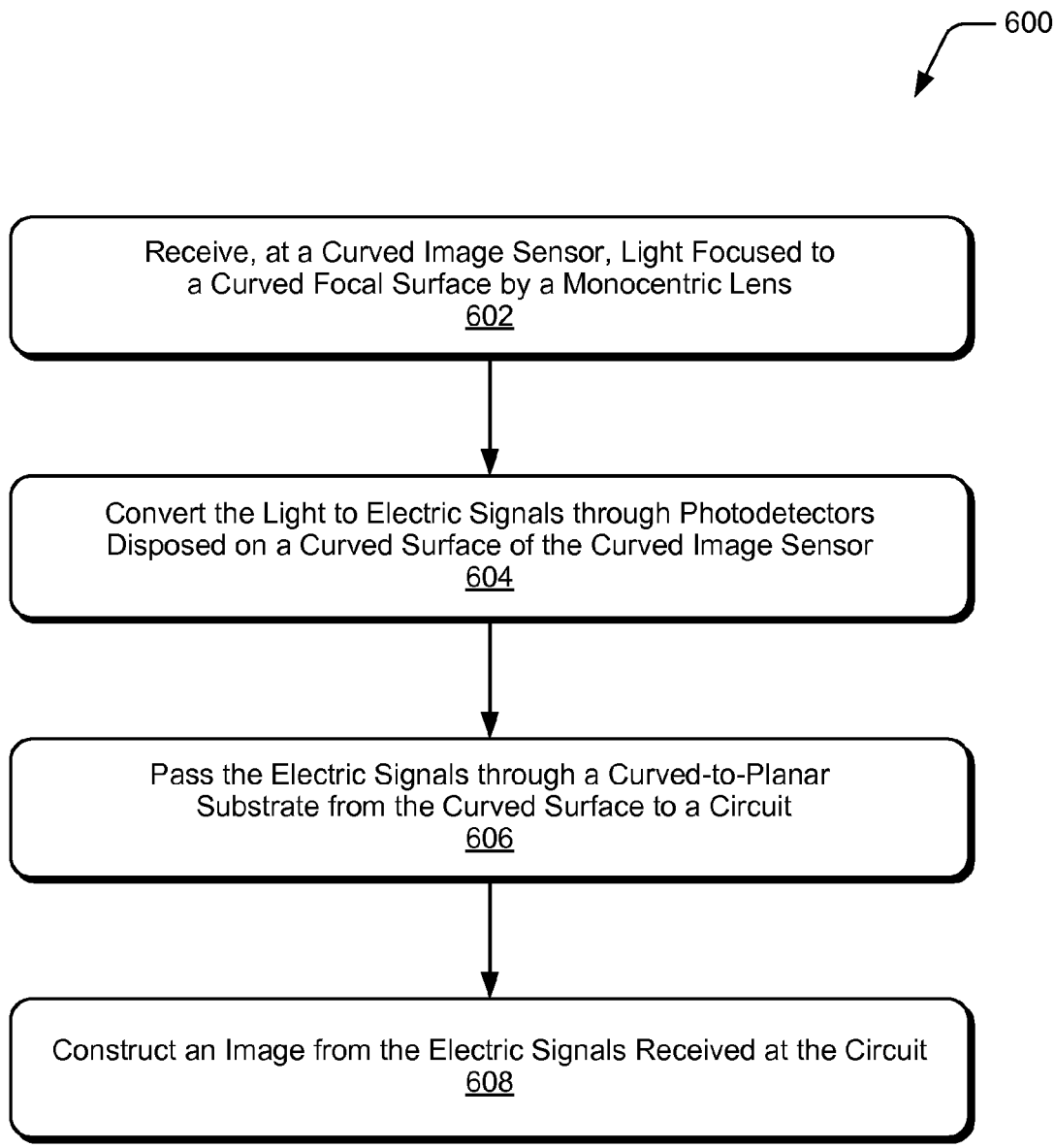
FIG. 6 illustrates example methods that use a curved image sensor and a monocentric lens to capture an image.

FIG. 6 illustrates method 600, which uses a curved image sensor along with a monocentric lens to capture an image. At 602, light that is received is focused to a curved focal surface by at least one monocentric lens. This light is received at a curved image sensor in which photodetectors are disposed on a curved surface. By way of example, assume that light from scene 204 of FIG. 2 is received by monocentric lens 108 of FIGS. 1 and 2.

At 604, the received light is converted to electric signals through the photodetectors disposed on the curved surface of the curved image sensor. The curved surface may be configured in any suitable way, such as including photodetectors that produce electric signals in response to exposure to light of one or more wavelengths. Continuing the ongoing example, the light from scene 204 is focused at curved focal surface 206 and sensed, by photodetectors 312 of FIG. 3, effective to produce electric signals.

At 606, the electric signals are passed through a curved-to-planar substrate from the curved surface to a circuit. Thus, electric signals corresponding to colors and color intensity sensed by photodetectors 312 are passed from curved-surface electric connection ends 412, through electric connections 406, and to electric receptors 408 on circuit 306, as shown in FIG. 4.

At 608, an image is constructed from the electric signals received at the circuit. Thus, circuit 306, alone or in combination with hardware, firmware, or software elements, constructs an image of scene 104. Image manager 512 of FIG. 5 may process or post-process the electric signals representing the image of scene 104, such as to alter a layout to fit a particular size (e.g., aspect ratio or frame size). Thus, if a round scene is captured, image manager 512 may convert the round image to a rectangular image for storage and use. Image manager 512 may also perform post-processing to improve resolution (e.g., for green, green, red, blue photodetectors in which the green photodetectors are also used for sharpness), filtering, and so forth. Circuit 306, however, may construct the image with little or no assistance, such as when an appropriate CMOS chip intended for image processing is used.

Figure 7:
FIG. 7 illustrates an image constructed from light sensed from the scene of FIG. 2.

Concluding the ongoing example, at 608, circuit 306 and image manager 512 construct image 702, illustrated in FIG. 7, from light sensed from scene 204 of FIG. 2.

Example Electronic Device

Figure 8:
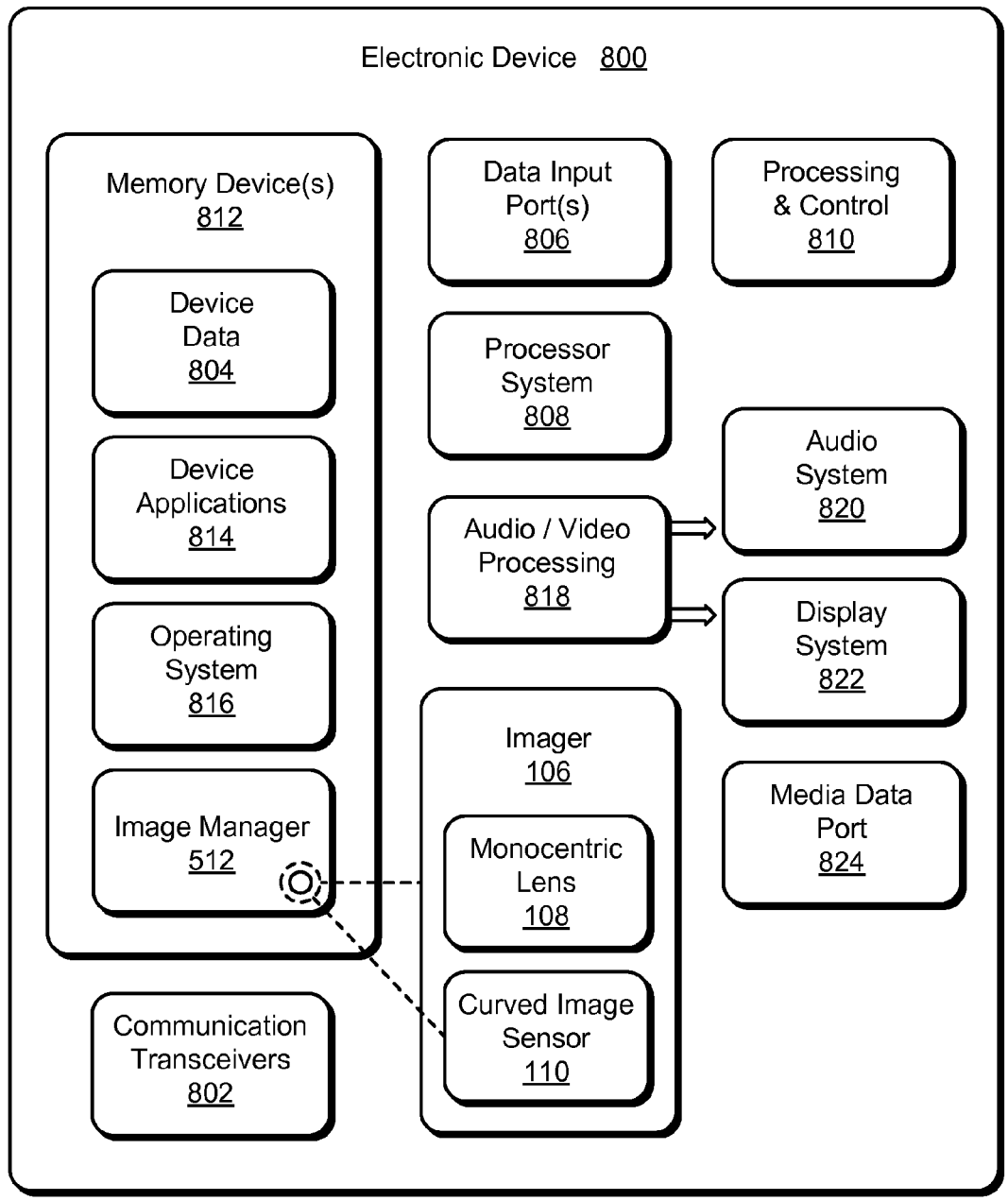
FIG. 8 illustrates various components of an electronic device that can implement a curved image sensor for a curved focal surface in accordance with one or more embodiments.

FIG. 8 illustrates various components of an example electronic device 800 that can be implemented as a computing device having an imager as described with reference to any of the previous FIGS. 1-7. Electronic device 800 may be implemented as any one or combination of a fixed or mobile device, in any form of a consumer, computer, portable, user, communication, phone, navigation, gaming, audio, camera, messaging, media playback, and/or other type of electronic device, such as computing device 102 described with reference to FIGS. 1 and 5.

Electronic device 800 includes communication transceivers 802 that enable wired and/or wireless communication of device data 804, such as received data, transmitted data, or sensor data as described above. Example communication transceivers include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

Electronic device 800 may also include one or more data input ports 806 via which any type of data, media content, and/or inputs can be received, such as user-selectable inputs, messages, music, television content, recorded video content, and any other type of audio, video, and/or image data received from any content and/or data source (e.g., other image devices or imagers). Data input ports 806 may include USB ports, coaxial cable ports, and other serial or parallel connectors (including internal connectors) for flash memory, DVDs, CDs, and the like. These data input ports may be used to couple the electronic device to components (e.g., imager 106), peripherals, or accessories such as keyboards, microphones, or cameras.

Electronic device 800 includes processor system 808 (e.g., any of application processors, microprocessors, digital-signal-processors, controllers, and the like), or a processor and memory system (e.g., implemented in a SoC), which process (i.e., execute) computer-executable instructions to control operation of the device. Processor system 808 may be implemented as an application processor, embedded controller, microcontroller, and the like. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and/or other hardware.

Alternatively or in addition, electronic device 800 can be implemented with any one or combination of software, hardware, firmware, or fixed logic circuitry that is implemented in connection with processing and control circuits, which are generally identified at 810 (processing and control 810). Hardware-only devices in which a curved image sensor for a curved focal surface may be embodied include those that convert, without computer processors, sensor data into voltage signals.

Although not shown, electronic device 800 can include a system bus, crossbar, or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Electronic device 800 also includes one or more memory devices 812 that enable data storage, examples of which include random access memory (RAM), non-volatile memory (e.g., read-only memory (ROM), flash memory, EPROM, EEPROM, etc.), and a disk storage device. Memory device(s) 812 provide data storage mechanisms to store device data 804, other types of information and/or data (e.g., image 702), and various device applications 814 (e.g., software applications). For example, operating system 816 can be maintained as software instructions within memory device 812 and executed by processor system 808. In some aspects, image manager 512 is embodied in memory devices 812 of electronic device 800 as executable instructions or code. Although represented as a software implementation, image manager 512 may be implemented as any form of a control application, software application, signal-processing and control module, or hardware or firmware installed on circuit 306 of imager 106.

Electronic device 800 also includes audio and/or video processing system 818 that processes audio data and/or passes through the audio and video data to audio system 820 and/or to display system 822 (e.g., a screen of a smart phone or camera). Audio system 820 and/or display system 822 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 824. In some implementations, audio system 820 and/or display system 822 are external components to electronic device 800. Alternatively or additionally, display system 822 can be an integrated component of the example electronic device, such as part of an integrated touch interface.

Electronic device 800 includes, or has access to, imager 106, which includes monocentric lens 108 and curved image sensor 110. Sensor data is received from imager 106 and/or curved image sensor 110 by circuit 306 and then image manager 512, here shown stored in memory devices 812, which when executed by processor system 808 constructs a final image as noted above and shown in FIG. 7.

Although embodiments of a curved image sensor for a curved focal surface have been described in language specific to features and/or methods, the subject of the appended claims is not necessarily limited to the specific features or methods described. Rather, the specific features and methods are disclosed as example implementations a curved image sensor for a curved focal surface.

What is claimed is:

1. A curved image sensor comprising:
   a curved surface on which photodetectors are disposed, the photodetectors capable of sensing light at the curved surface and providing, from the curved surface, electric signals in response to sensing the light;
   a curved-to-planar substrate capable of receiving the electric signals at the curved surface and providing the electric signals to a planar surface, the curved-to-planar substrate comprising:
   an array of electrical connections for providing the electric signals between the curved surface and the planar surface, each electrical connection having a curved-surface connection end and an electric receptor end, the curved-surface connection ends being irregularly arranged at the curved surface and the electric receptor ends being regularly arranged at the planar surface in a manner such that the electric receptor ends are not spatially consistent with the electric connection ends at the curved surface; and
   a circuit capable of receiving the electric signals at the planar surface and from the curved-to-planar substrate.

2. The curved image sensor as recited in claim 1, wherein the curved surface corresponds to a curved focal surface of a monocentric lens, the monocentric lens disposed at least partially within the curved surface.

3. The curved image sensor as recited in claim 1, wherein the photodetectors disposed on the curved surface comprise a deposited photodetector array.

4. The curved image sensor as recited in claim 3, wherein the deposited photodetector array includes active-pixel photodetectors.

5. The curved image sensor as recited in claim 1, wherein the photodetectors include an organic light-sensing material including one or more layers having amorphous sensing areas capable of spatially coherently detecting the light and converting the light into the electric signals.

6. The curved image sensor as recited in claim 5, wherein the organic light-sensing material includes three layers, each of the three layers being sensitive to a different wavelength of light.

7. The curved image sensor as recited in claim 5, wherein the amorphous sensing areas have a high conductivity in a direction perpendicular to the one or more layers and a low conductivity in a direction parallel to the one or more layers.

8. The curved image sensor as recited in claim 7, wherein the curved-surface connection ends are each connected to a respective one of the amorphous sensing areas.

9. The curved image sensor as recited in claim 1, wherein the photodetectors are quantum-dot photodetectors capable of sensing the light and producing the electronic signals in response to the light.

10. The curved image sensor as recited in claim 1, wherein the curved surface, the curved-to-planar substrate, and the circuit are integrated within a single die or substrate.

11. The curved image sensor as recited in claim 1, wherein a spacing between the curved-surface connection ends on the curved surface decreases as the distance from a center of the curved-to-planar substrate increases.

12. The curved image sensor as recited in claim 1, wherein the electric receptor ends on the planar surface are in a regular array.

13. A method comprising:
   receiving, at a curved image sensor in which photodetectors are disposed on a curved surface, light focused to a curved focal surface by at least one monocentric lens;
   converting the light to electric signals through the photodetectors disposed on the curved surface of the curved image sensor;
   passing the electric signals through a curved-to-planar substrate from the curved surface to a circuit, the curved-to-planar substrate comprising:
   an array of electrical connections for providing the electric signals between the curved surface and the circuit, each electrical connection having a curved-surface connection end and an electric receptor, the curved-surface connection ends being irregularly arranged at the curved surface and the electric receptors being regularly arranged at the circuit in a manner such that the electric receptor ends are not spatially consistent with the electric connection ends at the curved surface; and
   constructing an image from the electric signals received at the circuit.

14. The method as recited in claim 13, wherein the circuit is a planar Complementary Metal-Oxide Silicon (CMOS) chip and constructing the image is performed by the planar CMOS chip.

15. The method as recited in claim 13, wherein the photodetectors disposed on the curved surface of the curved image sensor includes one or more layers of organic light-sensing material or include one or more quantum dots or layers of quantum dots.

16. An imaging device comprising:
   a monocentric lens capable of providing a curved focal surface; and
   a curved image sensor, the curved image sensor having:
   a curved surface;
   a curved-to-planar substrate; and
   a circuit,
   the curved image sensor capable of sensing light of the curved focal surface at the curved surface and providing electric signals in response to sensing the light;

the curved-to-planar substrate capable of receiving the electric signals at the curved surface and providing the electric signals to a planar surface, the curved-to-planar substrate comprising:
- an array of electrical connections for providing the electric signals between the curved surface and the planar surface, each electrical connection having a curved-surface connection end and an electric receptor end, the curved-surface connection ends being irregularly arranged at the curved surface and the electric receptor ends being regularly arranged at the planar surface in a manner such that the electric receptor ends are not spatially consistent with the electric connection ends at the curved surface; and
- the circuit capable of receiving the electric signals at the planar surface and from the curved-to-planar substrate.

17. The imaging device as recited in claim 16, wherein the curved surface of the curved image sensor surrounds at least a portion of the monocentric lens.

18. The imaging device as recited in claim 16, wherein the monocentric lens is spherical and the curved surface is a portion of a sphere.

19. The imaging device as recited in claim 16, wherein the curved surface includes an array of the photodetectors and the circuit is a Complementary Metal-Oxide Silicon (CMOS) chip configured to read the electric signals of the array received via the curved-to-planar substrate.

20. The imaging device as recited in claim 16, further comprising:
- one or more computer processors; and
- one or more computer-readable storage media having instructions stored thereon that, responsive to execution by the one or more computer processors, performs operations comprising:
  - constructing an image from the electric signals received at the circuit, the image corresponding to the light of the curved focal surface; and
  - providing the image.

* * * * *